(No Model.) 2 Sheets—Sheet 1.
P. NICOLLS.
DOUBLE VENT DOUBLE FLUSHING WATER CLOSET.
No. 596,823. Patented Jan. 4, 1898.
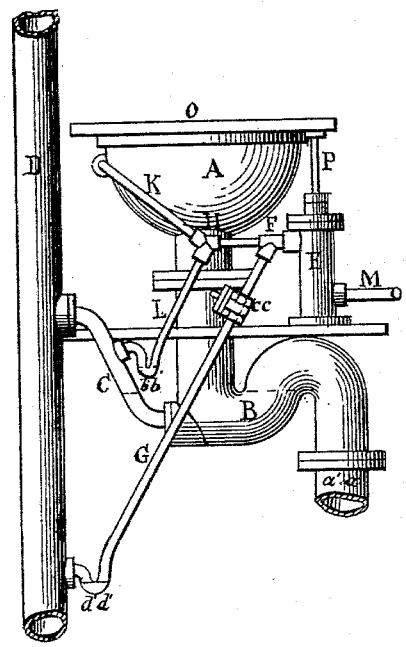
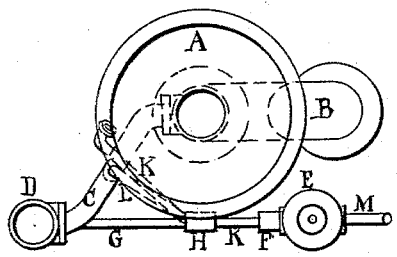
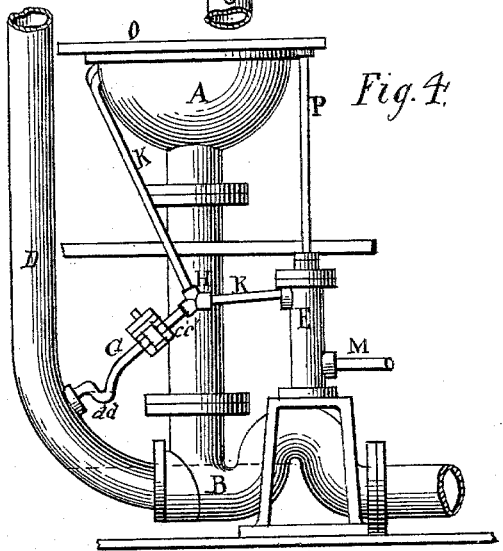
Witnesses,
Frederick James Beid.
Michael Gonder Scherck
Inventor.
Philip Nicolle

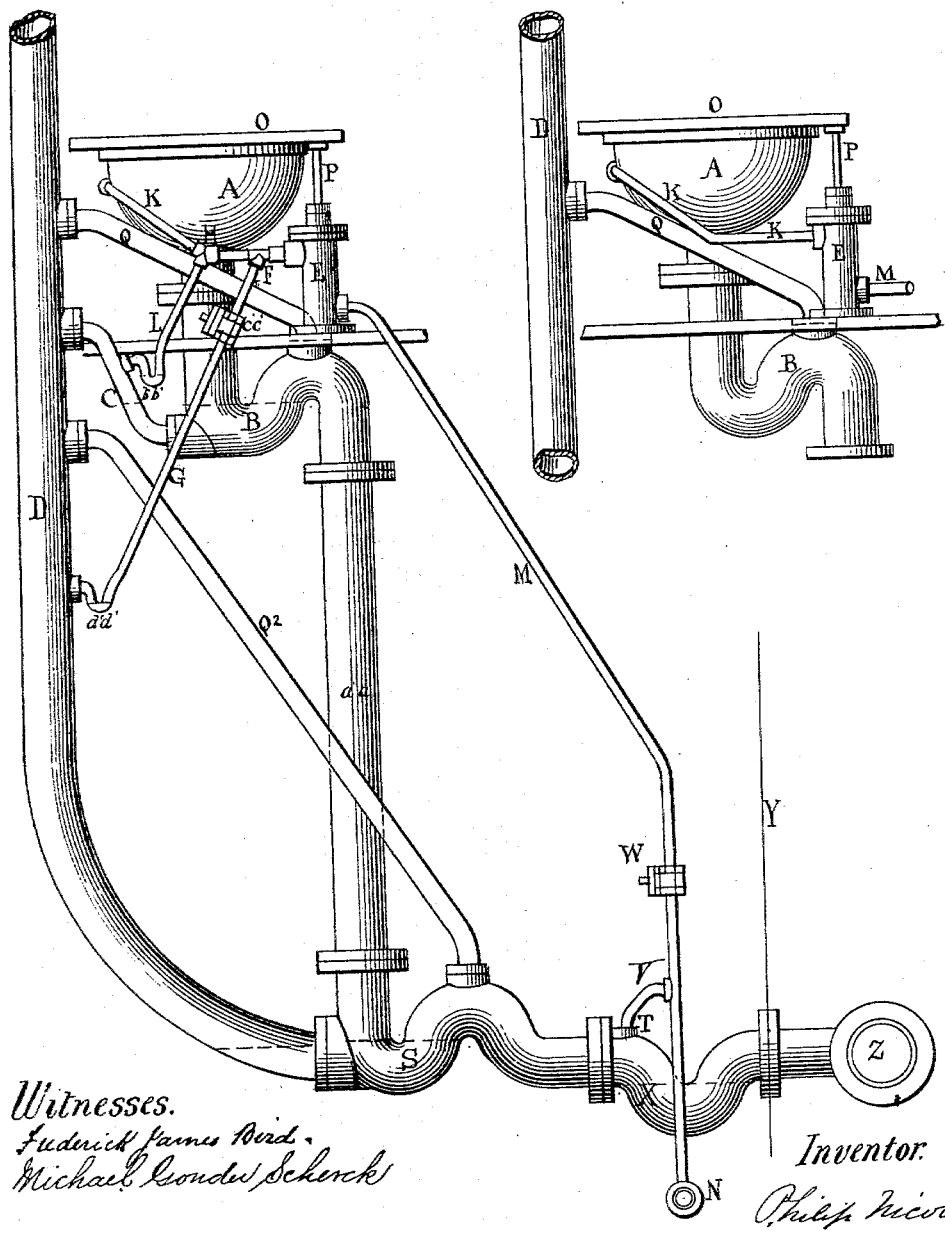

UNITED STATES PATENT OFFICE.

PHILIP NICOLLS, OF TORONTO, CANADA.

DOUBLE-VENT DOUBLE-FLUSHING WATER-CLOSET.

SPECIFICATION forming part of Letters Patent No. 596,823, dated January 4, 1898.

Application filed October 17, 1895. Serial No. 566,016. (No model.) Patented in Canada August 31, 1895, No. 70,482.

*To all whom it may concern:*

Be it known that I, PHILIP NICOLLS, a citizen of the Dominion of Canada, residing at the city of Toronto, in the county of York and Province of Ontario, Canada, have invented a new and useful improvement in the combination of a double-vent double-flushing water-closet and stopping sewer-gas from getting through any of the traps, (for which I have applied for a patent in Canada, No. 70,482, bearing date August 31, 1895,) of which the following is a specification.

My invention relates to improvements in water-closets which are so constructed as to be frost-proof, sewer-gas proof, and double flushing; and the objects of my improvements are, first, to provide a continuous double flushing (when the seat is occupied) of closet-bowl and trap under closet-bowl opposite soil-pipe and also the double flushing of lower trap (in winter) under soil-pipe; second, to provide a frost-proof pipe, through which pipe the water flows downward when the seat is released, said pipe will also be used for closet-bowl-flushing pipe to drain itself into; third, to provide traps at bottoms of flushing and vent pipes, all these traps to be sealed with water, and, fourth, to provide the sewer drain-trap with a water seal, especially in dry weather, (when building is unoccupied and city water turned off,) for the purpose of stopping sewer-gas from getting into sewer drain-trap. I attain these objects by mechanism illustrated in the accompanying drawings, in which—

Figure 1 is a front elevation of a part of the water-closet. Fig. 2 is a side elevation. Fig. 3 is a plan of the same. Fig. 4 shows the closet frost-proof. Fig. 5 is a view of closet and all the connections from top of closet down to main sewer in street. Fig. 6 is a view of closet, closet-bowl-flushing pipe, water-supply pipe, valve, trap, part of vent-pipe, and one revent-pipe.

Similar letters refer to similar parts throughout the several views.

I have shown in Fig. 5 the closet-bowl A, with its trap B and branch vent-pipe C. This vent-pipe C goes upward and is connected with main vent-pipe D. This vent-pipe D is carried up above roof of building. I have also shown in Fig. 5 the main soil-pipe $a\,a$ attached to trap B.

In Fig. 4 I have shown the valve E, through which the water is obtained from water-supply pipe M, also the junction F in closet-bowl-flushing pipe K, which junction is placed near valve E. I have also shown frost-proof flushing-pipe G, running downward from junction F with trap $d\,d$ and connected with main vent-pipe D.

When seat O is closed, it allows water to flow through flushing-pipes K up to closet-bowl A and G into main vent-pipe D. After seat is released the water only flows down through the said flushing-pipes K and G until these pipes are emptied, the junction H (shown on Fig. 5) on closet-bowl-flushing pipe K and flushing-pipe L from said junction H, with its trap $b\,b$, running downward and connecting with vent-pipe C. The junction F is also shown on closet-bowl-flushing pipe K and flushing-pipe G, with its trap $d\,d$ and tap $c\,c$ running downward and connected with main vent-pipe D. In Fig. 5 is shown the supply-pipe M from main water-supply pipe N. The closet-seat O when occupied presses down on rod P and sets the valve E open. The revent-pipes Q and $Q^2$ from traps B and S are carried upward and connected with main vent-pipe D. The branch T is shown on top of sewer drain-trap X, to which is connected the flushing and water-supply pipe V from junction of water-supply pipe M. When the building is unoccupied, the pipe V is used as a supply-pipe.

The tap W on water-supply pipe is only closed for shutting off water-supply to valve E, and is also closed when found necessary to flush sewer-trap X through pipe V. The pipe V is also used as a supply-pipe when tap W is closed. Y denotes the street-line. Z is the main sewer on street. I prefer to carry out this feature of my invention in the manner following and shown in Figs. 4 and 5.

In Fig. 4 it will be seen that when seat O is occupied it presses down on rod P and opens the valve E, making a complete double flushing of closet-bowl A and trap S under soil-pipe $a\,a$, in which case the pipe cannot possibly choke, leak, or overflow nor closet-bowl become soiled. When seat O is released, the valve E closes and allows the water in flushing-pipe K to flow downward from closet-bowl A and empty into junction F near valve E, frost-proof flushing and draining pipe G, and flowing thence into main vent-pipe D. The pipe G, previously referred to, together with closet-bowl-flushing pipe K, is immediately drained, with the exception of trap $dd$ at bottom of said pipe G, thus stopping sewer-gas from getting through trap $dd$ and up pipes G and K to the closet-bowl A. The water-supply pipe M, the valve E, the frost-proof pipe G, and part of closet-bowl-flushing pipe K are placed under basement-floor below frost, thus making the closet frost-proof.

In Fig. 5 the flushing-pipe L from junction H of closet-bowl-flushing pipe K may enter at end of trap B opposite soil-pipe $a\,a$ without going through vent-pipe C, in which case the flushing-pipe L will not require the trap $b\,b$, and when seat O is occupied it presses the rod P down and opens valve E, allowing water to make a complete double flushing of closet-bowl A and trap B under closet-bowl opposite soil-pipe $a\,a$. The flushing-pipe G, running downward from junction F, has a trap $d\,d$ connected to main vent-pipe D, thus stopping sewer-gas getting into closet-bowl through flushing-pipe K. This previously-mentioned pipe G is provided with a tap $c\,c$, to be opened when deemed necessary for flushing through end of lower trap S through main vent-pipe D.

The vent-pipes C and D are sealed with water at bottom level with the water in traps B and S, stopping sewer-gas from getting through the said traps and vent-pipes.

The sewer drain-trap X near street-line Y is sealed with water from water-supply pipe M by means of flushing and supply pipe V through branch T on top of said trap X. The pipe V, previously referred to, may have a tap for the purpose of stopping the water from getting into trap X. When necessary, this trap X can be flushed and thoroughly cleaned, so that no refuse can remain therein.

When the building is unoccupied and city water turned off, permission will be asked from the local authorities for a sufficient supply of water to insure seal of the sewer drain-trap X for the purpose of stopping sewer-gas from getting into the building (or adjoining ones) through the drain and carrying in its train a long line of diseases and oftentimes death. When permission has been granted by the authorities for a sufficient supply of water to insure seal of trap X, a tap W will be placed in water-supply pipe M in position indicated in Fig. 5, so that the water cannot enter any farther into the building.

I am aware that prior to my invention closet-bowls, traps, valves, taps, vent and re-vent pipes, and supply-pipes have been used. I therefore do not claim such a combination, broadly; but What I do claim as my invention, and desire to secure by Letters Patent, is—

1. In a water-closet the combination of a flushing-valve E, a flushing-pipe K, leading from said valve to the rim of the bowl A, a ventilating-pipe D connected at its lower end to the soil-pipe $a, a$, said soil-pipe being provided with a trap S at the junction of said soil and ventilating pipes, a trap B connected to said closet A, a pipe C connected at one end of said trap below the normal water-level thereof and at the other end to said ventilating-pipe, two branch pipes G and L each provided with a trap connected to said flushing-pipe one of the said branch pipes being also connected to said pipe C and the other to the ventilating-pipe D whereby the several traps will be flushed when the flushing-valve is opened, substantially as described.

2. In a water-closet the combination of a flushing-valve E, a flushing-pipe K leading from said valve to the rim of the bowl A, a branch pipe G provided with a tap $c, c$, connected at its upper end to said flushing-pipe, and at the lower end to ventilating-pipe D, whereby when tap $c, c$, is opened the said flushing and branch pipes will be drained, flowing into said ventilating-pipe when the flushing-valve is closed, substantially as described.

3. In a water-closet bowl A, the combination of a sealed trap B connected to said closet-bowl, a sealed pipe C connected at one end of said trap below the normal water-level thereof, a flushing-pipe K, a ventilating-pipe D, a branch pipe G connecting said flushing and ventilating pipes, a sealed trap $d\,d$ in the lower end of said branch pipe G, a branch pipe L connecting said flushing-pipe K and sealed pipe C, a trap $b, b$ in the lower end of said pipe L; whereby, the several traps being sealed, the sewer-gas cannot enter the closet-bowl, substantially as described.

PHILIP NICOLLS.

Witnesses:
JAMES C. MAJOR,
GEORGE SILLS.

Correction in Letters Patent No. 596,823.

It is hereby certified that the name of the patentee in Letters Patent No. 596,823, granted January 4, 1898, for an improvement in "Double-Vent, Double-Flushing Water-Closets," was erroneously written and printed "Philip Nicolls," whereas said name should have been written and printed *Philip Nicolle;* and that the said Letters Patent should be read with this correction therein that the same may conform to the record of the case in the Patent Office.

Signed, countersigned, and sealed this 1st day of February, A. D., 1898.

[SEAL.]
              WEBSTER DAVIS,
               *Assistant Secretary of the Interior.*

Countersigned:
 A. P. GREELEY,
  *Acting Commissioner of Patents.*